Patented July 27, 1943

2,325,038

UNITED STATES PATENT OFFICE 2,325,038

NUCLEAR SUBSTITUTED TRIARYLMETH-ANE DERIVATIVES AND PROCESS OF MAKING THEM

Lyman Chalkley, Brick Township, Ocean County, N. J.

No Drawing. Application December 13, 1939, Serial No. 309,107

5 Claims. (Cl. 260—387)

This invention relates to improvements in effecting nuclear substitution in the colorless derivatives of triarylmethane dyes, and to the novel substituted compounds so produced. In carrying out such reactions, it is important to maintain the stability of the colorless derivative and to carry out the substitution reaction under conditions which will retard or prevent the conversion of the colorless derivative into the parent dye.

In the past such nuclear substituted compounds have been prepared largely by condensation of substituted aryl amines and aldehydes, or their equivalent, to form triarylmethane derivatives; or by substitution in the amino triarylmethane dyestuffs.

The preparation of substitution products by condensation of the substituted aryl amines or aldehydes is limited in its application by the conditions required for condensation, which will split off or change sensitive groups, such as mercury; and by the course of the condensation reaction, which in presence of nuclear substituents in the aryl amine, or aldehyde, may proceed in undesired or unexpected directions.

The preparation of substitution products by substitution in the amino triaylmethane dyestuffs is limited by the great chemical activity of these dyes, which are subject to oxidation, reduction, and less well defined forms of decomposition. As a result, the preparation of identifiable nuclear substitution products from the amino triarylmethane dyes has been confined largely to sulfonation reactions, which can often be carried out satisfactorily with the dyes.

Thus, in the past there has been no general broadly applicable method for the preparation of nuclear substituted triarylmethane derivatives. The lack of such a process has prevented the preparation of certain useful compounds of this type. An example is that of mercury derivatives, which Whitmore and Leuck reported were not obtained in an exhaustive research on the subject. Their paper in the "Journal of the American Chemical Society," volume 51, September, 1929, states on page 2783 under the caption, "Attempted mercuration of malachite green and its base," that "This substance was treated with mercuric acetate under a great variety of conditions. The solvents used included various concentrations of ethyl alcohol, acetic acid, ethyl acetate, benzene, and mixtures of these. The time of heating varied from a few minutes to ten days. In no case was there any evidence of the formation of organic mercury compounds."

An object of my invention is to provide a broadly applicable general method for the preparation of nuclear substituted compounds from di and tri-amino triarylmethane derivatives. These compounds have use as antioxidants, as dyestuffs, as pharmaceuticals, etc. By means of my invention it is possible to introduce directly as nuclear substituents not only the more usual types, such as chlorine, bromine, nitro, but also the more sensitive types, such as mercury.

The basis of my invention is my discovery that the colorless derivatives of the amino triarylmethane dyes readily undergo smooth and controllable nuclear substitution provided the reaction is carried out under conditions which permit substitution to take place without the formation of dye, or before there has been enough dye formation to result in gross decomposition.

In order to make the detailed discussion of this reaction more intelligible I shall first explain what I mean by colorless derivatives of the amino triarylmethane dyes.

Doebner's Violet and pararosaniline may be considered prototypes of the amino triarylmethane dyes. These are generally formulated as follows:

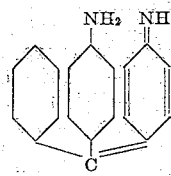   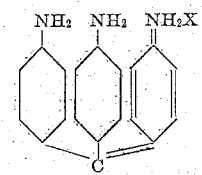

Doebner's Violet    Pararosaniline where X is an anion.

In other amino triarylmethane dyes the hydrogen of the amino groups, or of the nucleus, may be substituted, or another aromatic nucleus may replace the benzene. But all of these have the characteristics of the possession of two or three amino groups para to the central methane carbon atom, and the quinoid linkage of one of the aromatic nuclei.

By colorless derivatives of the amino triarylmethane dyes I refer to those relatively light colored compounds formulated in the system used above as derived from the dyes by a change of the quinoid nucleus into the hydroquinoid state, and the addition of a radicle to the methane carbon atom of the triarylmethane structure, without change in the state of oxidation of the molecule. The colorless derivatives of Doebner's Violet and pararosaniline, which may be considered prototypes, are formulated as follows:

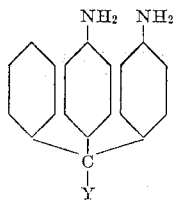 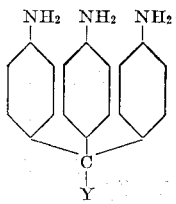

Colorless derivative of Doebner's Violet  Colorless derivative of pararosaniline Here Y is the negative radicle added to the methane carbon atom. Corresponding to differences in Y, a considerable number of types of these colorless derivatives are known. Thus, for examples, the carbinol type, or dye base, has for Y the hydroxyl group, —OH; the ethers have for Y such groups as methoxyl, —OCH$_3$, ethoxyl, —OC$_2$H$_5$; benzoxyl, —OCH$_2$C$_6$H$_5$; the nitriles have for Y the cyano group, —CN; etc.

These colorless derivatives may be prepared from the dyes by known methods using suitable reagents. Suitable reagents are the alkali metal salts MY, where M is an alkali metal ion, and Y the above-mentioned negative radicle. For example, the carbinols may be prepared with alkalies, the ethers with sodium alcoholates, the nitriles with alkali cyanides, etc.

The colorless derivatives may also be reconverted into the dyes by suitable reagents and methods. The majority of the known types of colorless derivatives are converted into the dyes by acids alone. Examples are the ethers, the amine bases, the carbthiols, the carbinols. This conversion takes place so readily that the dyes are generally considered simply as salts of the carbinols. For example, in the standard encyclopedia of organic compounds, "Beilstein's Handbuch der Organischen Chemie," the dyes are listed as salts of the carbinols, and the reactions of the dyes are described under the carbinols rather than under the listings of the dyes themselves. Reference is also made to "Chemical Reviews," vol. VI, No. 2, June 1929, pages 221 and 222, where the formulae of certain colorless derivatives of triphenyl methane dyes are given, by way of example, these including the cyanide, the carbinol, the amine base and the sulfite.

Therefore, the negative radicles represented by Y include the hydroxy group —OH, the ether group —OR, the nitrile group —CN, the amid group —NH$_2$, the sulfhydrile group —SH, and the sulfite group —SO$_3$H.

Likewise, because of the ease of conversion of such colorless derivatives into the dyes, it has generally been a matter of indifference whether the dye or some colorless derivative, usually the carbinol, were used as the starting product in a reaction involving an acid solution. For illustration, German Patent No. 6,714 gives examples for the sulfonation of malachite green in which either the carbinol or the dyestuff is used as the starting product. The claim properly reads on the dye because the sulfuric acid used in sulfonation converts the carbinol into the dye, and the solution of the carbinol in sulfuric acid is a solution not of the carbinol but of the dye. Similarly, in German Patent No. 27,275 directions call for a solution of 25 kg. of malachite green carbinol in 1000 liters of water and 50 kg. of acetic acid. Actually this amount of malachite green carbinol is not soluble unchanged in this amount and concentration of acetic acid. Solution takes place only on conversion of the carbinol into the dye, and the solution is one of dye, not of carbinol, as can readily be determined by colorimetric comparison with dye solutions of known composition.

It has long been believed that the conversion of a colorless derivative into a dye involved something more of a structural change than simple salt formation. This belief has found expression in the structural formulas given above for the dyes and their colorless derivatives, and the mechanism of the change is formulated as follows, using malachite green as an example:

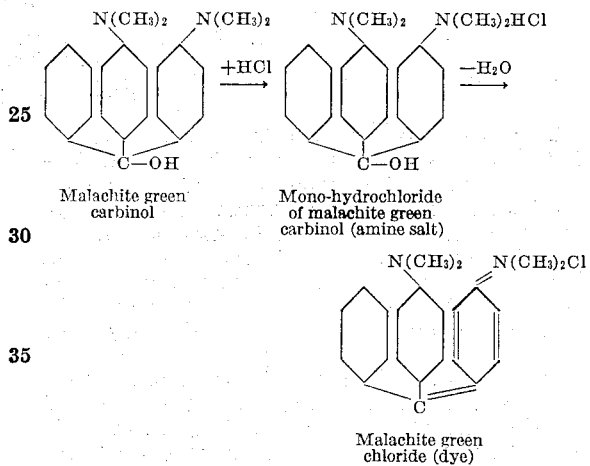

Malachite green carbinol   Mono-hydrochloride of malachite green carbinol (amine salt)

Malachite green chloride (dye)

Thus, the first product of the reaction of the colorless derivative with acid is not a dye but an amine salt, which is unstable and passes into the dye on loss of water.

In spite of these long known differences between the colorless derivatives and the corresponding dyes, the practice has been to consider the two types of compounds equivalent in their synthetic reactions, the acidity or alkalinity of the reaction mixture determining whether the compound was present as dye or as colorless derivative.

The reactions generally used to introduce substituents into aryl amines involve acid reaction mixtures. The acid is present either as an initial constituent of the mixture or is formed in the reaction. Therefore, in the past when colorless derivatives of the basic triarylmethane dyes have been used as starting products in reactions which might produce substitution, they have reacted as dyes because they were in fact in the dye form in the acid reaction mixtures.

Now I have discovered that the chemical properties of the colorless derivatives are distinctly different from those of the dyes as regards behavior on substitution. Whereas the dyes suffer severe decomposition when treated with many of the reagents which produce substitution, the colorless derivatives substitute smoothly and without undue decomposition.

My invention consists essentially in carrying out substitution in the colorless derivatives of basic triarylmethane dyes under conditions which hold the major part of the triarylmethane compound stable in the form of the colorless derivative, and prevent or retard the conversion of the colorless derivative into the dye. In the past, attempts to introduce substituents into this class of compounds have involved two reactions, substitution and dye formation. But in the process of my invention I carry out the substitution under conditions which separate these reactions and prevent or retard dye formation while permitting substitution to proceed. In this way I achieve greatly improved results and find it possible to prepare compounds which previous attempts at synthesis have failed to produce.

I attain reaction conditions which prevent or retard dye formation by use of one or more of the following procedures:

(1) Reduction of the acidity of the reaction mixture.
(2) Use of nonionizing solvents, such as ethyl acetate, ethyl propionate, benzene, toluene, the xylenes, etc., which I have found increase the stability of the colorless derivatives to acid.
(3) Screening of the reaction mixture from radiation which is active in the conversion of the colorless derivative into the dye.
(4) Use of low temperatures to retard the conversion of the colorless derivative into the dye.
(5) Use of rapid substitution reactions so as to increase the differential between the velocity of the substitution and the speed of conversion of the derivative into the dye.
(6) Use of a colorless derivative which has a high inherent resistance to conversion into dye under the conditions present in the substitution reaction mixture. I have found that the colorless derivatives of different types vary considerably in the ease with which they are converted into dye by acid. For example, the carbinols are quite sensitive to acid, the ethers are less so, and the nitriles are virtually insensitive to acid alone when screened from active radiation.

I find that in general the conventional types of reagents which are employed to introduce nuclear substituents into arylamino compounds may be used satisfactorily in my process. Chlorination with chlorine, bromination with bromine, nitration with nitric acid, mercuration with mercuric acetate to form compounds of the type, RHgX (where R is an organic radicle), are examples of such conventional reagents; and these reactions as well as others can all be carried out with the colorless derivatives.

My invention is not limited to the preparation of direct substitution products, but can be used for indirect substitution in which the original directly introduced substituents are replaced by, or converted into, other atoms or groups. Thus, directly introduced nitro groups may be reduced to amino groups and the latter subjected to their numerous changes; or directly introduced mercury may be replaced by iodine, or other halogen; etc. Such reactions do not necessarily require the isolation of the intermediate direct substitution product.

I have found that the substituted colorless derivatives made by my process can be converted into the substituted parent dyes, or into other types of colorless derivatives, by the same reagents which are effective with the unsubstituted derivatives. Thus my invention is not limited to the preparation of substitution products of the colorless derivative with which I start the reaction, but once a substituted colorless derivative has been obtained it may be converted into the substituted parent dye or another type of colorless derivative of the parent dye.

These conversion reactions in general follow the known course for the type of colorless derivative involved, and are applicable to the substituted colorless derivatives just as they are to the unsubstituted derivatives.

EXAMPLE 1.—*Mercuration of Malachite green carbinol to the dimercuri derivative.*—A solution of 7 g. (2/100 mole) of 4,4' bis-dimethylamino-triphenylcarbinol in 250 cc. of ethyl acetate is treated with 9.7 g. (3/100 mole) of 98% mercuric acetate, and boiled under a reflux condenser with constant stirring for 25 minutes. No acetic acid is added to the reaction mixture in contrast with the usual practice in the mercuration of arylamines. The deep blue solution is cooled, filtered from the precipitated mercurous acetate, and shaken with an added 8 cc. of 4 normal aqueous potassium hydroxide solution. The ethyl acetate is evaporated at room temperature and pressure. The gummy residue, which is the diacetoxy mercuri derivative of malachite green carbinol is separated from the water left on evaporation, washed with water and taken up at room temperature in 100 cc. of absolute methyl alcohol. The solution is filtered and treated immediately with 20 cc. of 2 normal potassium hydroxide in absolute methyl alcohol. The dihydroxymercuri-bis-dimethylamino-triphenylcarbinol precipitates immediately, and, after standing an hour, is collected on a filter, washed with a little methyl alcohol and then thoroughly with water, and dried in a vacuum desiccator over sulfuric acid. The white earthy substance contains about 45% of mercury and is pure enough for use as an intermediate in the preparation of other compounds.

It can be further purified as follows: A suspension of 1 g. in 12 cc. of methyl alcohol is treated with 2.4 cc. of normal acetic acid in methyl alcohol, whereupon the solid dissolves. The solution is filtered and treated with 2 cc. of 2 normal potassium hydroxide in methyl alcohol. The precipitate is allowed to settle for 2 hours, then collected on a filter, washed with a little methyl alcohol and thoroughly with water. It is dried in a vacuum desiccator over sulfuric acid. The substance contains 47.5% mercury, and probably contains 2 molecules of methyl alcohol of crystallization. It has the probable structural formula:

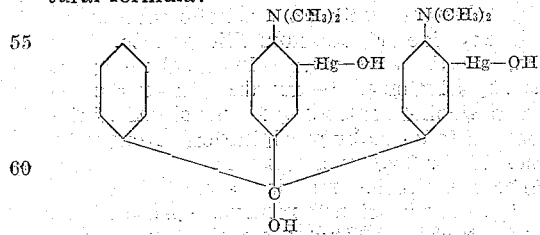

This substance decomposes when heated above 200°. The temperature at which rapid decomposition sets in varies considerably with the rate of heating and the length of time the sample is held in the hot melting point bath.

A dicyanomercuri derivative is readily prepared from the dihydroxymercuri compound. A suspension of 8 g. of the dihydroxymercuri malachite green carbinol in 100 cc. of methyl alcohol is treated slowly under stirring with 9 cc. of normal acetic acid in 95% methyl alcohol. The resulting solution is filtered and treated with 22 cc. of a normal solution of sodium cyanide in 65% methyl alcohol. The clear colorless solution is treated immediately with 1 volume (130 cc.) of water, whereupon the dicyanomercuri malachite green carbinol precipitates. This has the probable structural formula:

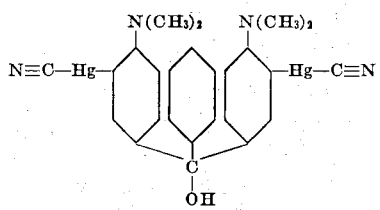

3,3' dicyanomercuri-4,4'-bis-dimethylamino-triphenylcarbinol

The solid is collected after 6 hours in which to settle, washed thoroughly with water and dried in a desiccator.

This dicyanomercuri derivative forms a crystalline compound from toluene. Pure toluene and the mercury compound in the proportion of 20 to 30 cc. of toluene to 1 g. of mercury compound are stirred vigorously together at room temperature for not longer than four minutes. The resulting solution is decanted from any residue. Colorless crystals begin to separate in a few minutes. The mixture is allowed to stand for 4 days, the crystals are collected, washed with toluene and air dried. The crystals are less soluble in both alcohol and toluene than the original compound. Put in a cold melting point bath and heated the compound decomposes above 200° C., the temperature of rapid decomposition varying with the rate of heating.

Other salts, such as the acetate, chloride, sulfate, thiocyanate, etc., of the organic mercury compound are readily prepared from the hydroxide without changing the carbinol structure. These salts all have the general formula:

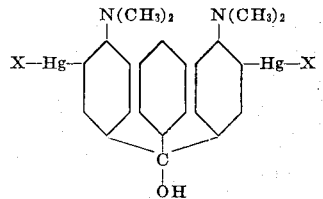

where X is the anion of the acid used.

The chloride and thiocyanate are relatively insoluble in alcohol and may be prepared by precipitation from an alcoholic solution of the acetate by treatment with an alcoholic solution of calcium chloride or potassium thiocyanate. The sulfate, acetate, and other soluble salts may be isolated by solution of the dihydroxymercuri compound in alcohol containing 2 equivalents of the proper acid followed by precipitation through the addition of 1 to 2 volumes of water.

In the substitution reaction described in this example dye formation is retarded by use of the nonionizing solvent ethyl acetate and reduction in the acid concentration of the reaction mixture below that commonly used in the mercuration of aryl amines. A little dye is formed, but the quantity is too small to result in any considerable decomposition or materially reduced yields.

The preparation of dye from this mercurated carbinol is illustrated in the three following examples.

EXAMPLE 1A.—*Preparation of the dye acetate.*—One g. of dihydroxymercuri-bis-dimethylamino-triphenylcarbinol is dissolved in 12 cc. of methyl alcohol containing 2½% by volume of acetic acid, and the solution boiled under a reflux condenser for 20 minutes. The solution is then cooled, diluted with 2 volumes (24 cc.) of water and allowed to stand 24 hours. It is then filtered from any diacetoxymercuri-bis-dimethylamino-triphenylcarbinol which may not have been converted into dye. The deep blue filtrate contains in solution diacetoxymercuri-malachite green acetate, having the probable structural formula:

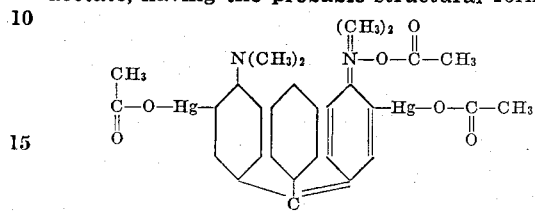

3,3'-diacetoxymercuri-malachite green acetate

This dyestuff is quite soluble in alcohol and in water. It may be isolated by evaporation of its aqueous-alcoholic solution, but is inclined to be gummy or tarry. In general it is better to prepare the dye solutions from the carbinol rather than from the solid dye. This dyestuff dyes silk and wool to a color indistinguishable to the naked eye from dyeing with unmercurated malachite green.

When the aqueous-alcoholic solution of this dye is treated with sodium chloride, even in small amount, a precipitate is obtained. This precipitate contains only a small proportion of the dichloromercuri malachite green chloride, which might be expected, and consists mainly of dichloromercuri malachite green carbinol. Analysis of a representative precipitate produced by sodium chloride shows 9.3% chlorine. The calculated percentage of chlorine in dichloromercuri malachite green chloride is 12.7%, and in dichloromercuri malachite green carbinol is 8.7%.

EXAMPLE 1B.—*Preparation of the dye benzenesulfonate.*—One g. of dihydroxymercuri malachite green carbinol is dissolved in a mixture of 3.45 cc. of normal aqueous benzenesulfonic acid solution and 35 cc. of methyl alcohol. The solution is heated to boiling. It should then give no immediate precipitate on dilution with water. The deeply colored solution contains the benzene sulfonate of the dimercuri malachite green, having the probable structural formula:

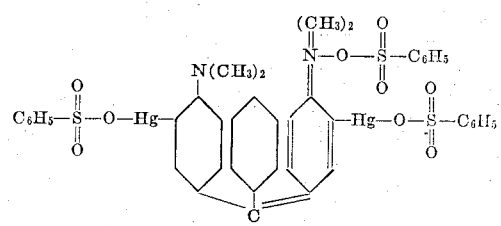

This dye is soluble in alcohol and in water. It may be isolated by evaporation of the solvent, but is obtained in a tarry form. The dyestuff may be partially salted out of solution along with sodium sulfate by treatment of the alcoholic solution prepared as described above with 2 volumes of ½ molar sodium sulfate solution. The dye solution gives an insoluble precipitate with sodium chloride. The dye solution dyes silk the same color as unmercurated malachite green.

EXAMPLE 1C.—*Preparation of dicyanomercuri malachite green benzenesulfonate.*—One g. of dicyanomercuri malachite green carbinol as precipitated from alcohol by water (not the toluene compound, which is less soluble) is dissolved in 6 cc. of methyl alcohol, cooled to 0° and treated with a mixture of 0.62 cc. of normal aqueous benzene sulfonic acid and 6 cc. of alcohol. The solution is mixed well, then warmed slowly to boiling, and allowed to stand at room temperature for 24 hours. The solution contains dicyanomercuri malachite green benzenesulfonate, having the probable structural formula:

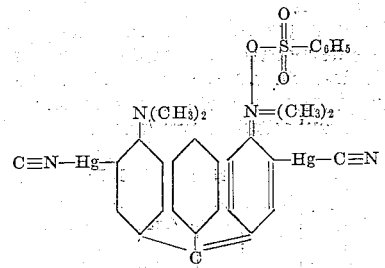

3,3′ dicyanomercuri-malachite-green benzene-sulfonate

This dye is readily soluble in alcohol and in mixtures of alcohol and water, but is not very soluble in pure water. This dyestuff dyes silk and wool to a color indistinguishable to the naked eye from dyeing with unmercurated malachite green. It may be isolated by evaporation of its alcoholic solution, and is tarry when so obtained. Sodium chloride in low concentration produces no precipitate in the aqueous or aqueous-alcoholic solution of the dye. In high concentration sodium chloride produces a precipitation along with a decomposition which involves removal of part of the cyanide ion from the mercury. Hydrochloric acid and concentrated sulfuric acid liberate hydrogen cyanide from the dye solution.

It will be seen from these illustrations that from the mercurated carbinol malachite green derivatives of the general type,

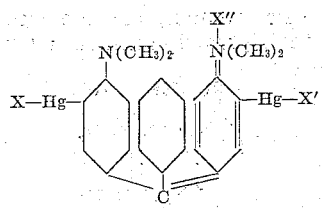

are readily obtained. Here X, X′ and X″ are anions, but not necessarily all the same anions.

EXAMPLE 2.—*Mercuration of the ethyl ether derived from malachite green to the dimercuri compound.*—A solution of 3.4 g. (1/100 mole) of 4,4′-bis-dimethylamino-triphenylmethyl-ethylether in 200 cc. of warm ethyl acetate is treated with 6.4 g. (2/100 mole) of 98% mercuric acetate in solid form, without addition of acetic acid and the mixture boiled under a reflux condenser with vigorous stirring for 15 minutes. The light blue solution is then cooled, filtered from the precipitated mercurous acetate, shaken with an added 5 cc. of 4 normal aqueous potassium hydroxide solution and the ethyl acetate allowed to evaporate in the air at room temperature. The gummy residue is separated from the aqueous layer which remains after the evaporation of ethyl acetate, and washed with water. The residue is then taken up in 70 cc. of absolute methyl alcohol at room temperature, the solution filtered, and the filter washed with 20 cc. more of alcohol, which is added to the filtrate. The filtrate is treated with 15 cc. of 2 normal potassium hydroxide solution in methyl alcohol. There immediately forms a precipitate of the dimercuri compound having the probable structural formula:

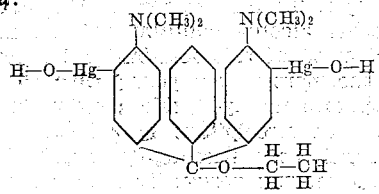

3,3′-dihydroxymercuri-4,4′-bis-dimethylamino-triphenylmethyl-ethylether

This precipitate is allowed to settle for 1 hour, then collected on a filter, washed with a little cold alcohol, then thoroughly with water, and dried in a vacuum desiccator. The substance contains 45.5% mercury and is quite pure enough for most uses.

For further purification, 1 g. of the substance is suspended in 12 cc. of absolute methyl alcohol, the mixture cooled to 0° and treated with 2 cc. of a cold normal solution of acetic acid in 95% methyl alcohol which is added slowly with stirring. The mercury compound goes into solution as the diacetoxymercuri-bis-dimethylamino-triphenylmethyl-ethylether. The solution is filtered, and the hydroxymercuri compound reprecipitated by addition of 2 cc. of 2 normal potassium hydroxide solution in methyl alcohol. The precipitate is collected on a filter, washed with a little alcohol and then thoroughly with water and dried in a vacuum desiccator over sulfuric acid. The substance contains 46.5% mercury, and probably contains 2 molecules of methyl alcohol of crystallization.

This substance decomposes when heated above 200°, the temperature at which decomposition becomes pronounced varying with the rate of heating and the length of time the sample is held in the hot melting point bath.

The ether is readily converted into the mercurated dyestuff by the same processes which have been described for the conversion of the mercurated carbinol into the dye. The ethyl group is hydrolyzed by acid and the same dyes are formed as when the mercurated carbinol is used as the starting product.

In this substitution reaction of the ethyl ether derived from malachite green which I have described there is virtually no formation of dye. The ether in ethyl acetate solution is practically insensitive to the small quantities of acetic acid formed even though a larger proportion of mercuric acetate to colorless dye derivative is used than in the example with the carbinol.

EXAMPLE 3.—*Mercuration of the nitrile derived from malachite green to form the dimercuri compound.*—A solution of 7.1 g. (2/100 mole) of 4,4′-bis-dimethylamino-triphenylacetonitrile in 150 cc. of warm ethyl acetate and 3 cc. of acetic acid is treated with 12.8 g. (4/100 mole) of 98% mercuric acetate, and boiled in the absence of ultra violet light under a reflux condenser for 1½ hours. The solution is then cooled, filtered from the precipitated mercurous acetate, and evaporated in vacuo from a 30° C. bath to a volume of 35 cc. The solution is filtered from the slight, newly formed precipitate, the precipitate washed with a little ethyl acetate which is added to the filtrate, and the filtrate diluted with 140 cc. of absolute methyl alcohol. The resulting solution is treated with 60 cc. of 2 normal potassium hydroxide solution in methyl alcohol. A precipitate forms, which is collected after 4 hours, washed with a little methyl alcohol, and thoroughly with water, and dried. The substance is purified by solution of 4 grams in 100 cc. of absolute methyl alcohol containing 1 cc. of acetic acid, filtration of this solution and reprecipitation of the mercury compound with 16 cc. of 2 normal potassium hydroxide solution in methyl alcohol. The precipitate is collected, washed with alcohol, then thoroughly with water, and dried in a vacuum desiccator over sulfuric acid. It contains 50.2% of mercury and has the following probable structural formula:

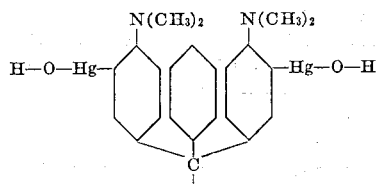

3,3′ dihydroxymercuri-4,4′-bis-dimethylamino-triphenyl-acetonitrile

This compound decomposes on heating above 200° C., the temperature of rapid decomposition varying with the rate of heating and the time the sample is held at a high temperature in the melting point bath.

EXAMPLE 3A.—*Conversion of the mercurated nitrile into the dye.*—A solution of 1 g. of the dihydroxymercuri-nitrile described above in 100 cc. of 95% methyl alcohol and 2½ cc. of acetic acid is exposed to the light of an ultra violet carbon arc. The solution is held in a quartz flask, and is stirred while the flask is cooled with water during the exposure. After 6 hours of exposure the solution is poured into one volume of water, allowed to stand 24 hours for precipitation of unchanged nitrile, and filtered through a fine filter paper. The deep blue filtrate contains a dye having the probable structural formula:

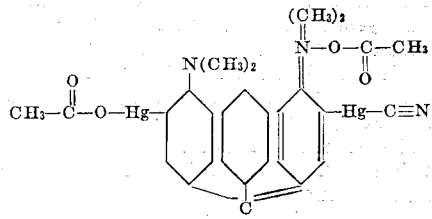

3 acetoxymercuri-3′-cyanomercuri-malachite-green acetate

It should also be understood that while the invention has been illustrated by a number of specific examples, the invention is not limited to the precise procedures and chemicals mentioned in these examples, but may be carried out in other ways.

I claim as my invention:

1. A process for the preparation of substitution products from the colorless derivatives of triarylmethane dyes, of the type having the formula:

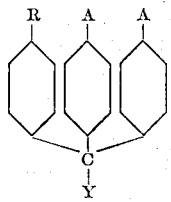

where R is selected from the group consisting of hydrogen, an amino group, A is an amino group, and Y is a negative radicle selected from the group consisting of —OH, —OR (R being alkyl), —CN, —NH₂, —SH, —SO₃H; consisting in effecting nuclear substitution in at least one of the aryl rings, by treating such colorless derivatives with an ionizable mercuric compound in the presence of a solvent.

2. As a new product, a substituted product of a colorless derivative of a triphenyl methane dye, such colorless derivative being characterized by having a negative radicle on the methane carbon atom, such substituted product having the formula:

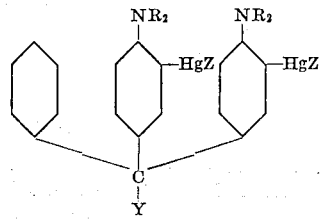

wherein R is an alkyl radicle, Z is an anion, and Y is a negative radicle selected from the group consisting of —OH, —OR (R being alkyl), —CN, —NH₂, —SH, —SO₃H.

3. As a new product, diacetoxymercuridimethylaminotriphenylcarbinol, having the formula:

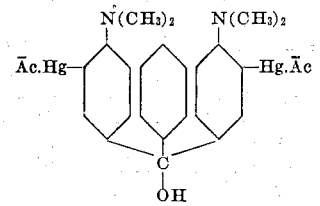

4. As a new product, dicyanomercuri-bis-dimethyl-aminotriphenyl carbinol, having the formula:

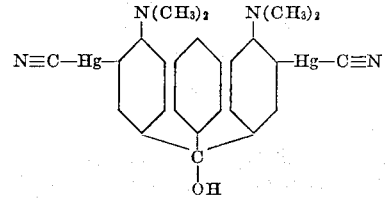

5. As a new product, 3,3′ dihydroxymercuri-4,4′-bis-dimethylamino-triphenylcarbinol, having the formula

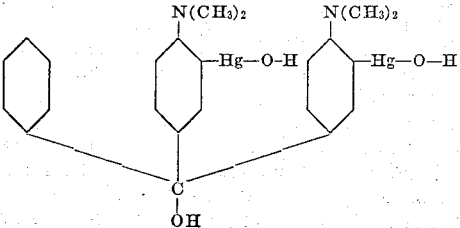

LYMAN CHALKLEY.